S. S. HARTSHORN.

Buckles.

No. 5,755. Reissued Feb. 3, 1874.

Witnesses.

J. H. Shumway

A. J. Tibbals

West Haven Buckle Co. assignee of
Sheldon S. Hartshorn
Inventor
By Atty
John S. Earle

AM. PHOTO-LITHOGRAPHIC CO. N.Y. (OSBORNE'S PROCESS)

UNITED STATES PATENT OFFICE.

THE WEST HAVEN BUCKLE COMPANY, OF WEST HAVEN, CONN., ASSIGNEE, BY MESNE ASSIGNMENTS, OF SHELDON S. HARTSHORN.

IMPROVEMENT IN BUCKLES.

Specification forming part of Letters Patent No. 13,218, dated July 10, 1855; extended seven years; reissue No. 5,755, dated February 3, 1874; application filed January 21, 1874.

*To all whom it may concern:*

Be it known that SHELDON S. HARTSHORN, deceased, late of the town of Orange, in the county of New Haven and State of Connecticut, did invent a new and useful Improvement in Buckles; and we do hereby declare the following, when taken in connection with the accompanying drawings and the letters of reference marked thereon, to be a full, clear, and exact description of the same, and which said drawings constitute part of this specification, and represent, in—

Figure 1:
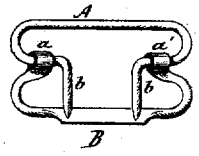
Figure 2:
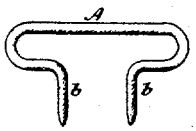
Figure 3:
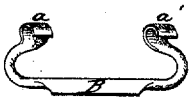

Figure 1, a perspective view of the buckle complete; Fig. 2, the tongues and loop detached; and in Fig. 3, a perspective view of the frame.

This invention relates to an improvement in the construction of that class of buckles which are composed of two parts, the frame or bow constituting one part, and the loop and tongues, in one and the same piece, the other part; and the invention consists, first, in hinging the said two parts together by turning or bending the ends of the loops or first part around corresponding points of the second part; second, in forming the loop and tongues from a single piece of wire bent into form so that the two ends of the wire form the two tongues.

B is the frame or first part, formed into the proper shape, according to the purpose for which the buckle is intended, its two ends, *a a'*, flattened and bent around the second part, substantially as seen in Fig. 1, so as to form hinged sockets to hold the second part and allow it to be turned freely therein. This constitutes the first part of the invention. The loop A and tongues *b b* are formed from a single piece of wire bent into form, as seen in Fig. 2, the two ends of the wire forming the tongues pointed. This peculiar form of the second part is connected to the frame or first part A in the manner before described, and shown in Fig. 1.

What we claim as the invention of the said SHELDON S. HARTSHORN is—

1. A buckle in which the frame forms one part, and the tongues and loop the second part, the said two parts hinged together by bending or turning the ends of the frame around corresponding points of the second part, substantially as described.

2. A loop and tongue for a two-part buckle formed from a single piece of wire, substantially as described.

GEO. R. KELSEY,
*Treasurer for West Haven Buckle Co.*

Witnesses:
J. H. SHUMWAY,
A. J. TIBBITS.